United States Patent
Wright et al.

(10) Patent No.: US 9,181,768 B2
(45) Date of Patent: Nov. 10, 2015

(54) METHOD AND APPARATUS FOR DETECTING PLUNGER ARRIVAL

(75) Inventors: Terry R. Wright, Johnstown, CO (US); Burke E. Lowrey, Littleton, CO (US); Paul T. Roberts, Frederick, CO (US)

(73) Assignee: PCS FERGUSON, INC., Frederick, CO (US)

( * ) Notice: Subject to any disclaimer, the term of this patent is extended or adjusted under 35 U.S.C. 154(b) by 934 days.

(21) Appl. No.: 13/161,431

(22) Filed: Jun. 15, 2011

(65) Prior Publication Data

US 2012/0323493 A1 Dec. 20, 2012

(51) Int. Cl.
*G01V 1/40* (2006.01)
*E21B 23/00* (2006.01)

(52) U.S. Cl.
CPC ...................................... *E21B 23/00* (2013.01)

(58) Field of Classification Search
CPC ............ E21B 23/00; E21B 47/00; G01P 3/66
USPC ..................... 702/6; 166/255.1, 113
See application file for complete search history.

(56) References Cited

U.S. PATENT DOCUMENTS

| | | | |
|---|---|---|---|
| 4,291,761 A * | 9/1981 | Watson ............................ | 166/66 |
| 6,084,406 A * | 7/2000 | James et al. ................... | 324/253 |
| 6,243,660 B1 | 6/2001 | Hsu et al. | |
| 6,297,732 B2 | 10/2001 | Hsu et al. | |
| 7,040,401 B1 * | 5/2006 | McCannon .............. | 166/250.15 |
| 7,451,549 B1 | 11/2008 | Sodhi et al. | |
| 7,819,189 B1 * | 10/2010 | Cosby ......................... | 166/255.1 |
| 2002/0084071 A1 * | 7/2002 | McCoy et al. ............. | 166/255.1 |
| 2006/0054329 A1 * | 3/2006 | Chisholm ...................... | 166/372 |
| 2009/0157341 A1 * | 6/2009 | Cheung ............................ | 702/85 |
| 2014/0121971 A1 * | 5/2014 | Hanak et al. ....................... | 702/6 |
| 2014/0231079 A1 * | 8/2014 | Scantlebury et al. ....... | 166/255.1 |

OTHER PUBLICATIONS

PNI Sensor Corporation; User Manual RM3000 & RM2000, Reference Magnetic Sensor Suite, Apr. 2011, Santa Rosa, CA, United States.

* cited by examiner

*Primary Examiner* — Janet Suglo
*Assistant Examiner* — Stephanie Bloss
(74) *Attorney, Agent, or Firm* — Marsh Fischmann & Breyfogle LLP (57) ABSTRACT

The disclosed device provides a high-accuracy plunger arrival detection system comprising a low-power magnetometer with high sensitivity and which is capable of sampling low or high intensity magnetic fields. The device processes gathered data from sensors, stores at least some processed data in memory, executes a trending algorithm which compares the magnetic field of the plunger to the ambient magnetic field or a predetermined set of initialization values, and generates an output which is relayed to a well controller. An output signal may be via hard wire, RF, wireless or other known means. In addition, the implementation of two sensing devices mounted in series and in spaced relation to each other, can provide for an actual plunger average velocity. An actual plunger average velocity, as opposed to approximate average velocity, can be used to better optimize well control and improve safety of the overall well production system.

9 Claims, 9 Drawing Sheets

SECTION A-A

METHOD AND APPARATUS FOR DETECTING PLUNGER ARRIVAL

TECHNICAL FIELD OF ART

The disclosed device relates generally to a plunger lift system employed on a wellhead of a gas-producing well, and more specifically to a microprocessor-based system for detecting the arrival of a traveling plunger by exploiting the magnetic properties of the plunger.

BACKGROUND

A plunger lift system is a cost-effective way to maximize production returns on mature or underperforming oil and gas wells. Plunger lift removes liquid from the well using the well's own energy so production can be increased for the operator.

In a typical plunger lift system, a lubricator is attached to the wellhead and serves to catch a plunger, which travels in the well tubing, upon its arrival at the surface. During its travel cycle, a plunger alternately pushes a liquid column during its rise cycle and falls to a bottom hole spring location during the fall time so it may begin another cycle. An arrival sensor is attached to the lubricator and signals the controller when the plunger is at the surface. When the controller signals the well to close, the plunger falls to the bottom hole spring location. Although the bottom hole spring is typically positioned at the end of the well tubing, it may also be positioned at any point in the tubing string using a collar stop or a tubing stop. When the controller signals the well to open, the energy of the formation pushes the plunger and the liquid column toward the surface. Thus, arrival detection can be a major component of a plunger lift system. If an arrival sensor misses an actual plunger arrival, or falsely signals a plunger arrival, the well can easily load up and stop producing.

There are currently a variety of methods of detecting plunger arrival at the lubricator. Some of these methods utilize inductive sensors mounted to the wellhead. Acoustical sensors can also be used. Other of these methods take advantage of the magnetic state (or phase) of metal in the metal making up the plunger itself. For example, one method uses a coil to detect induced voltage changes as a moving magnetic field from the plunger moves past the coil. However, various operational factors, such as plunger speed, plunger position, its degree of rotation, the level and type of magnetism involved in the material of construction, and the applied magnetic field, can each affect the ability of a system to accurately detect plunger arrival. What is needed is a method and apparatus for integrating various sensor capabilities into a unit that provides a platform capable of reliably and accurately detecting actual plunger arrival to minimize production anomalies.

The disclosed device utilizes a magneto-inductive sensor apparatus to detect actual plunger arrivals, thus minimizing false positives in the detection of plunger arrivals. The microprocessor of the disclosed device allows for control of the resolution needed for the detection of a plunger without the typical issues found in an analog implementation. In addition, the disclosed device is capable of interfacing with a variety of generic or branded equipment types, thus providing for expansive employability.

SUMMARY OF THE DISCLOSURE

The disclosed device provides a microprocessor-based magneto-inductive sensor that can detect the arrival of a plunger in a plunger lift system. The microprocessor interfaces with sensors capable of detecting a magnetic field in the plunger material. Specifically, the sensors detect the plunger's magnetics in at least one of the x, y, z axes. The system analyzes the detection data and ascertains a plunger arrival based on a value which represents a plunger's presence. The microprocessor is adapted to manage and control the sensors and sensor reporting capabilities and to manage overall functions of the detection system.

The disclosed device provides for a microprocessor-based magneto-inductive sensor which detects a magnetic field of the local environment and a change in the magnetic field in two or more axes, the change in the magnetic field being associated with an arriving plunger.

The disclosed device provides for microprocessor-based magneto-inductive sensors which detect plunger magnetics in all three axes to provide a more accurate representation of the magnetism present in the plunger. The microprocessor stores the three axis readings in separate arrays which are continuously updated with a running average method. Data in the separate arrays is analyzed for a change representing plunger detection.

The disclosed device provides a compact, rugged and portable mechanism that can be conveniently mounted and secured to an outer diameter of piping adjacent a lubricator/catcher.

The disclosed device provides for a microprocessor which interfaces with one or more axes through a custom application-specific integrated circuit (ASIC).

The disclosed device provides a microprocessor-based magneto-inductive sensor that can detect the arrival of a plunger in a plunger lift system having its own electrical power supply.

The disclosed devices provides for a method of detecting plunger arrival at a wellhead.

The disclosed device provides for a method of detecting plunger arrival at a wellhead by monitoring a change in the magnetic field in one or more axes when compared to a baseline, the change in the magnetic field being associated with an arriving plunger.

The disclosed device provides for a method of detecting plunger arrival at a wellhead by monitoring a change in the magnetic field in one or more axes when compared to a baseline, the change in the magnetic field being associated with an arriving plunger, and storing one or more magnetic field values in an axially-defined running average array.

The disclosed devices provides for a method of determining an average velocity of a traveling plunger in a production well.

The disclosed device provides for the implementation of two sensing devices placed at a known distance from each another and useful for the determination of an average velocity of a traveling plunger in a production well.

The disclosed device provides for a method of allowing a microprocessor to make a determination that the average velocity of the traveling plunger exceeds a predetermined average velocity and to activate a system control which shuts in the well.

The disclosed device provides for a method of allowing a microprocessor to make a determination to open or close one or more control valves to change the average velocity of the traveling plunger, wherein the one or more control valves can be placed in line with or between a tubing and a casing of the production well.

The disclosed device provides for a method of allowing a microprocessor to control the shut in and open cycle of the production well, thereby adjusting pressure build up in the tubing or casing of the production well based on actual average velocity data derived from a sensing of plunger magnetics.

These and other advantages of the disclosed device will appear from the following description and/or appended claims, reference being made to the accompanying drawings that form a part of this specification wherein like reference characters designate corresponding parts in the several views.

Before explaining the disclosed embodiments of the disclosed device in detail, it is to be understood that the device is not limited in its application to the details of the particular arrangements shown, since the device is capable of other embodiments. Also, the terminology used herein is for the purpose of description and not of limitation.

DETAILED DESCRIPTION OF THE FIGURES

The following description is provided to enable any person skilled in the art to make and use the disclosed apparatus. Various modifications, however, will remain readily apparent to those skilled in the art, since the generic principles of the present apparatus have been defined herein specifically to provide for a method and apparatus for detecting a plunger arrival.

Figure 1:
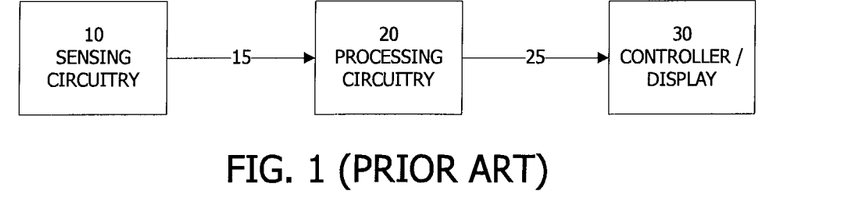
FIG. 1 is a block diagram depicting the elements in a prior art instrument utilizing a sensing device and the processing of the output.

Apparatus which utilize magnetic object proximity sensing are known in the art and have been used for applications such as in the above-referenced case in which a coil detects induced voltage changes from the magnetic field of a plunger moving past the coil. FIG. 1 depicts a basic process flow diagram illustrating the output 15 of sensing circuitry 10 in a single sensing element being received by processing circuitry 20 to yield field information or field output 25. Field output 25 can be further processed to be displayed on a controller/display 30, if desired.

Figure 2:
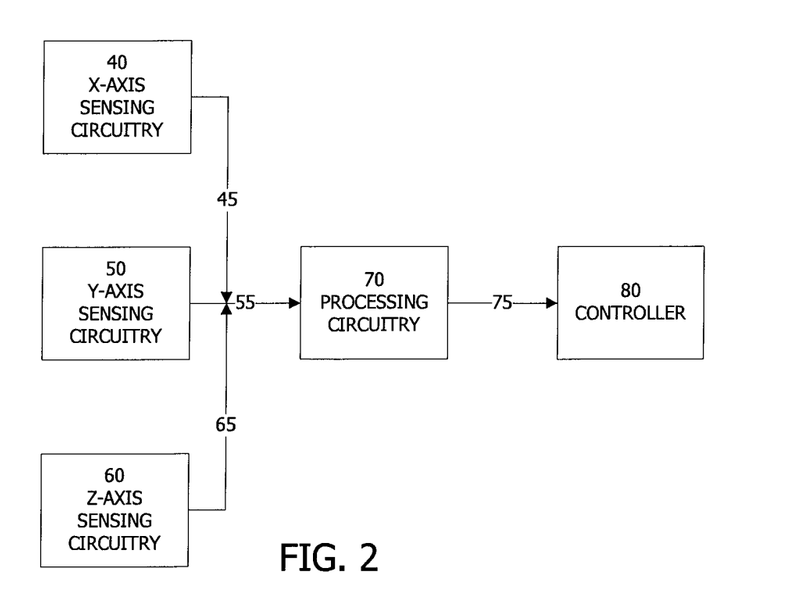
FIG. 2 is a block diagram depicting the elements in an instrument utilizing a sensing device and the processing of the output, wherein multiple sensing devices are employed.

The device disclosed herein utilizes multiple sensors with axes in different directions to provide data relative to field direction. In one embodiment of the disclosed device, a three-axis magnetometer is employed. As shown in FIG. 2, sensing circuitry 40, 50, 60 may be arranged mutually orthogonally (x, y, z). Outputs 45, 55, 65 are received by processing circuitry 70 which utilizes suitable algorithms to generate output data 75. Output 75 can be transmitted via an external line to controller 80 to indicate plunger arrival, the external line comprising hard wire, RF, wireless or other known means. It will be apparent to those with skill in the art of plunger arrival detection that the use of a three-axis magnetometer is convenient and not necessarily limiting to the disclosure. For example, a two-axis device could be used, the device also being sufficiently accurate in detecting plunger arrival.

Figure 3:
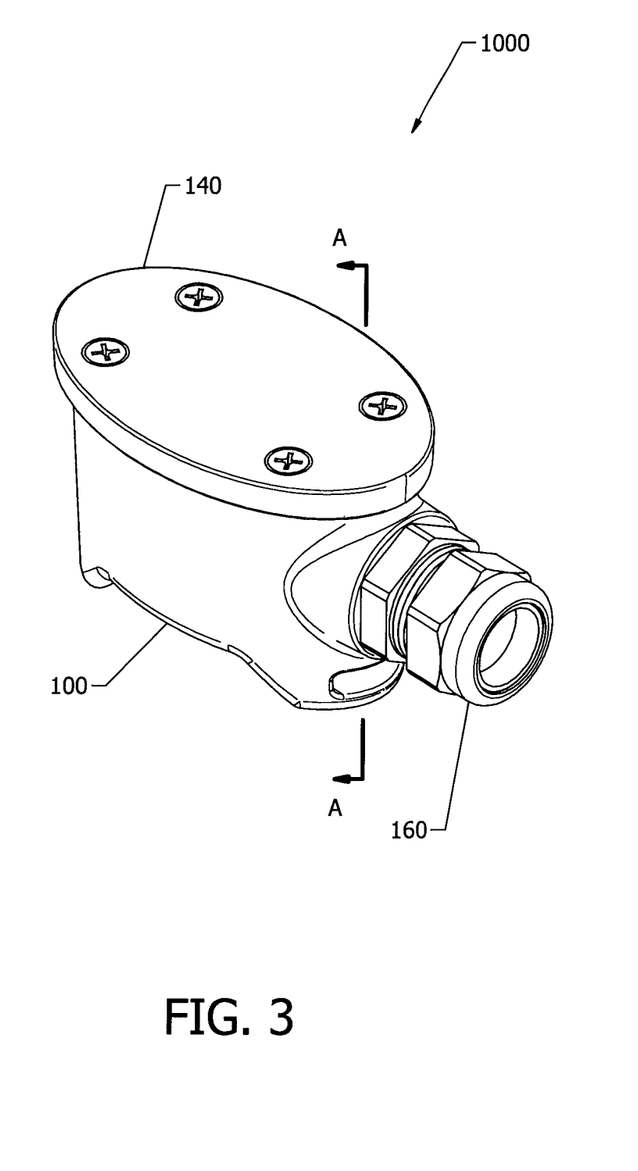
FIG. 3 is a perspective view of one embodiment of the sensing device disclosed herein.
Figure 4:
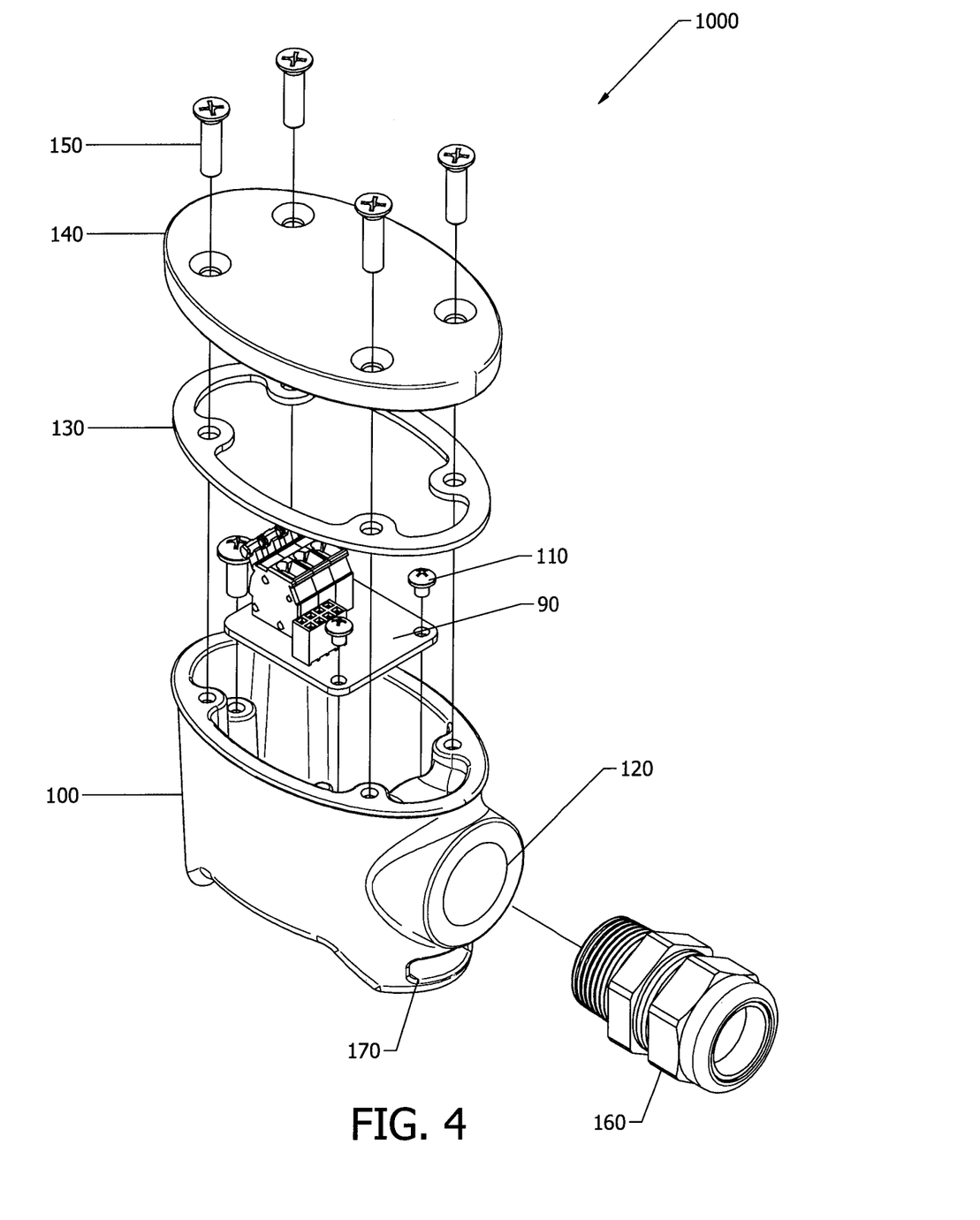
FIG. 4 is a exploded view of the embodiment shown in FIG. 3.
Figure 5:
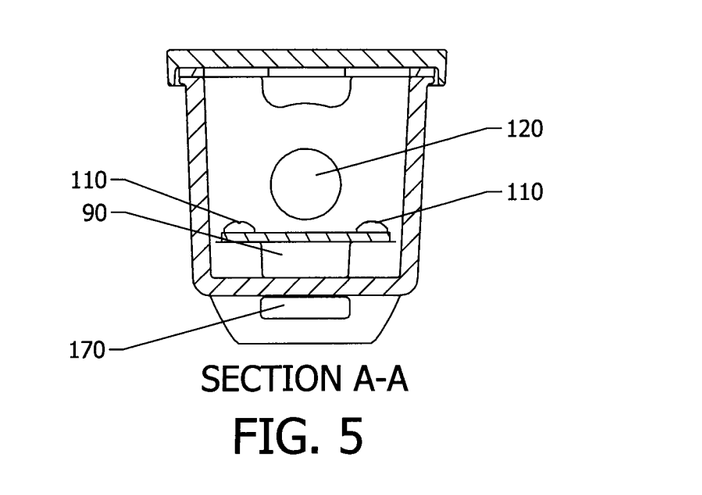
FIG. 5 is a cross-sectional view taken along lines A-A.
Figure 6:
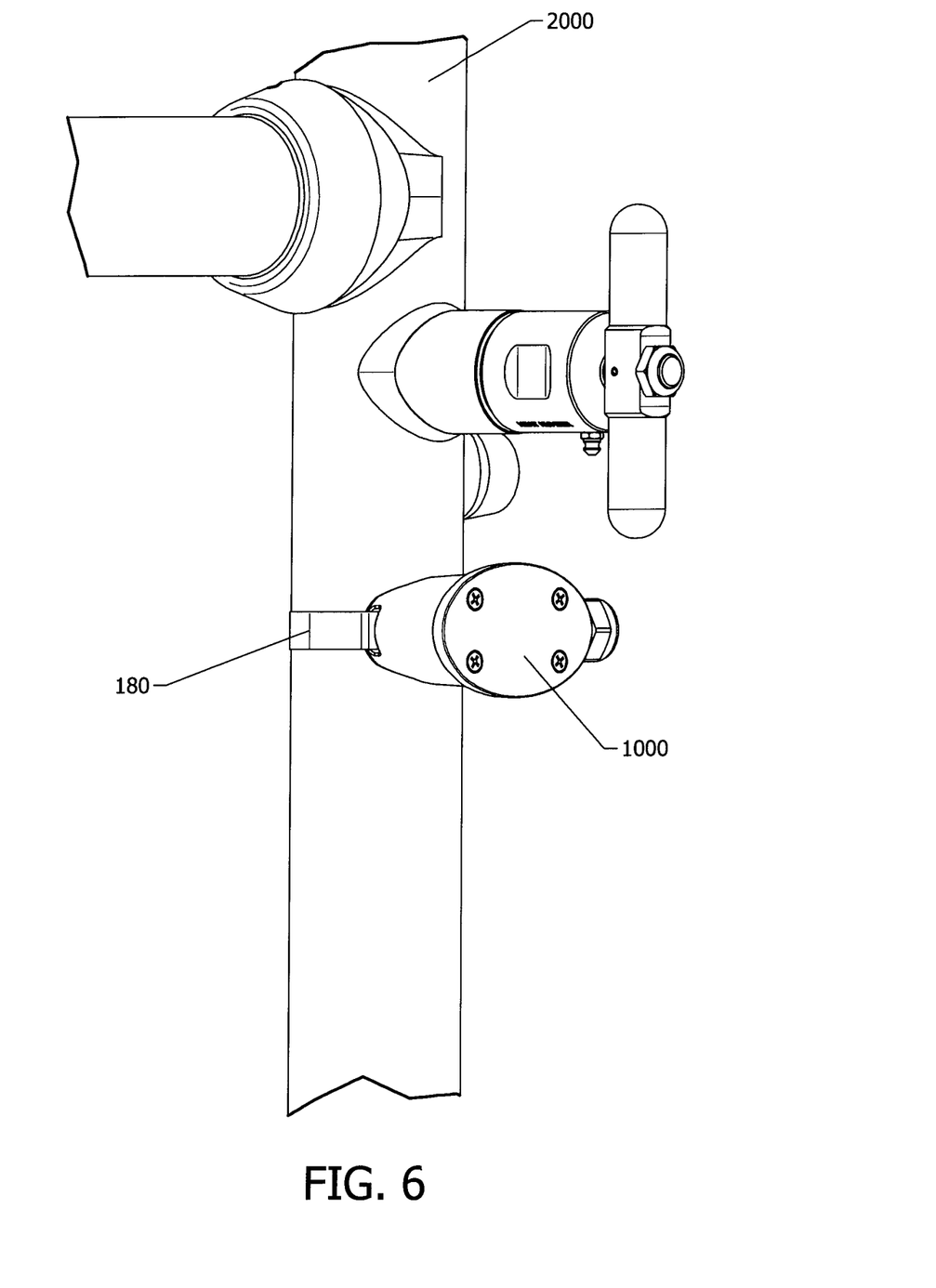
FIG. 6 depicts the apparatus installed on a lubricator/catcher.

As shown in FIGS. 3, 4, 5, detector 1000 comprises magnetometer 90 mounted in housing 100 and secured thereto with fasteners 110. A potting (not shown) serves to encase magnetometer 90 in housing 100 at a position below the bottom of orifice 120. Gasket 130 provides a mechanical seal. Lid 140 is fastened to housing 100 by means of fasteners 150. A strain relief connector 160 mounted in orifice 120 enables cable functionality. An end of a stainless steel hose clamp 180 is passed through receiving slot(s) 170 and allows for the strap-on installation of detector 1000 to an outer diameter of a pipe adjacent lubricator/catcher 2000 as shown in FIG. 6. Detector 1000 is electrically connected to an electronic well controller (not shown) mounted to piping in proximity to lubricator/catcher 2000 and from which detector 1000 may derive its power for operation. Thus, the disclosed device provides a compact, rugged and portable mechanism that can be conveniently mounted and secured to an outer diameter of piping adjacent a lubricator/catcher.

The disclosed system comprises a magnetometer device using an inductive sensor element. In one embodiment, a high-sensitivity weak-field magnetometer such as the MagIC provided by PNI (Precision Navigation Inc.) Corporation is employed to provide a device with up to three axes. The PNI Mag-IC magnetometer was chosen because of its small size (6.3 mm×2.3 mm×2.2 mm), its low power requirements (draws <500 μA at 3 VDC), its large field measurement range (±200 μT) and a high resolution field measurement (0.015 μT). The sensor element of the Mag-IC magnetometer comprises a plastic bobbin having a winding of N1 turns of electrically conductive wire. An elongated core of high-direct-current-permeability material is arranged along the central axis of the bobbin. Voltage across the coil is monitored by connection to the ends of a coil wire. Variations in voltage are processed as an indicator of the strength of any magnetic field in the direction of the axis of the bobbin.

One having skill in the art of plunger arrival detection equipment will recognize that other magnetometers may be used and the example set forth herein is not necessarily limiting to the disclosure. There are many other devices, materials, specifications, and geometries that may be used within the spirit and scope of the disclosed device. For example, it is contemplated that the apparatus may comprise three magnetometers. In addition, the apparatus could comprise two magnetometers or optionally, a magnetometer with two axes. The adaptability of the disclosed device allows one or more sensors to be economically incorporated into one unit that may be programmed and operated by a single microprocessor.

In operation, the detector device senses a magnetic field of the local environment and a change in the magnetic field which is to be associated with an arriving plunger. The disclosed system enables the sensor to characterize its magnetic environment dynamically upon startup or continuously or at a user's optional command. As will be discussed below, one embodiment of the disclosed device performs a calibration routine automatically at startup. For systems that continuously monitor the magnetic environment without a shut in period, it may be advantageous to cause a recalibration to occur to ensure the reliability of the system. For example, it may be useful to recalibrate the system once a day. In some cases, it may be decided that recalibration should occur every one hour or other interval. With recalibration, local disturbances in an ambient magnetic field caused by nearby magnetic objects, for example, magnetic fields generated by electrical currents, will be less likely to trigger a false reading and a tripping of the plunger lift system.

In addition, the magnetic distortion field created by the system can change over time. When there are magnetic distortion changes, a user should perform a distortion calibration. Because it is difficult for a user to know when to calibrate for the distortion and potentially inconvenient to perform a calibration each time the magnetic distortion field is changed, an automatic interval-based calibration can be employed. The third scenario, where calibration is initiated at a user's optional command, can be useful in cases where the system has been on for an extended period of time yet the plunger has not arrived.

The calibration of the disclosed device can be implemented for either a two-axis or three-axis system. A two-axis system may require less computing power and memory and for certain applications, it may be more cost effective to use a two-axis system and still meet accuracy requirements.

In an effort to avoid a calibration technique which requires a large amount of memory and processing time, the disclosed device utilizes a cost-effective microprocessor (Texas Instruments MSP430G2201 16-bit Ultra-Low Power) capable of monitoring and reviewing sensor data for an applicable trend and allowing the detector to process commands quickly and efficiently to maintain its arrival detection accuracy within a changing magnetic environment. The system comprises circuitry and software which enables the microprocessor to cause plunger arrival information derived from readings from the magnetometer to be transmitted to a suitable well controller. Moreover, the system effectively filters the sensor data to remove spurious data to prevent noise from affecting the magnetic field values.

Figure 7:
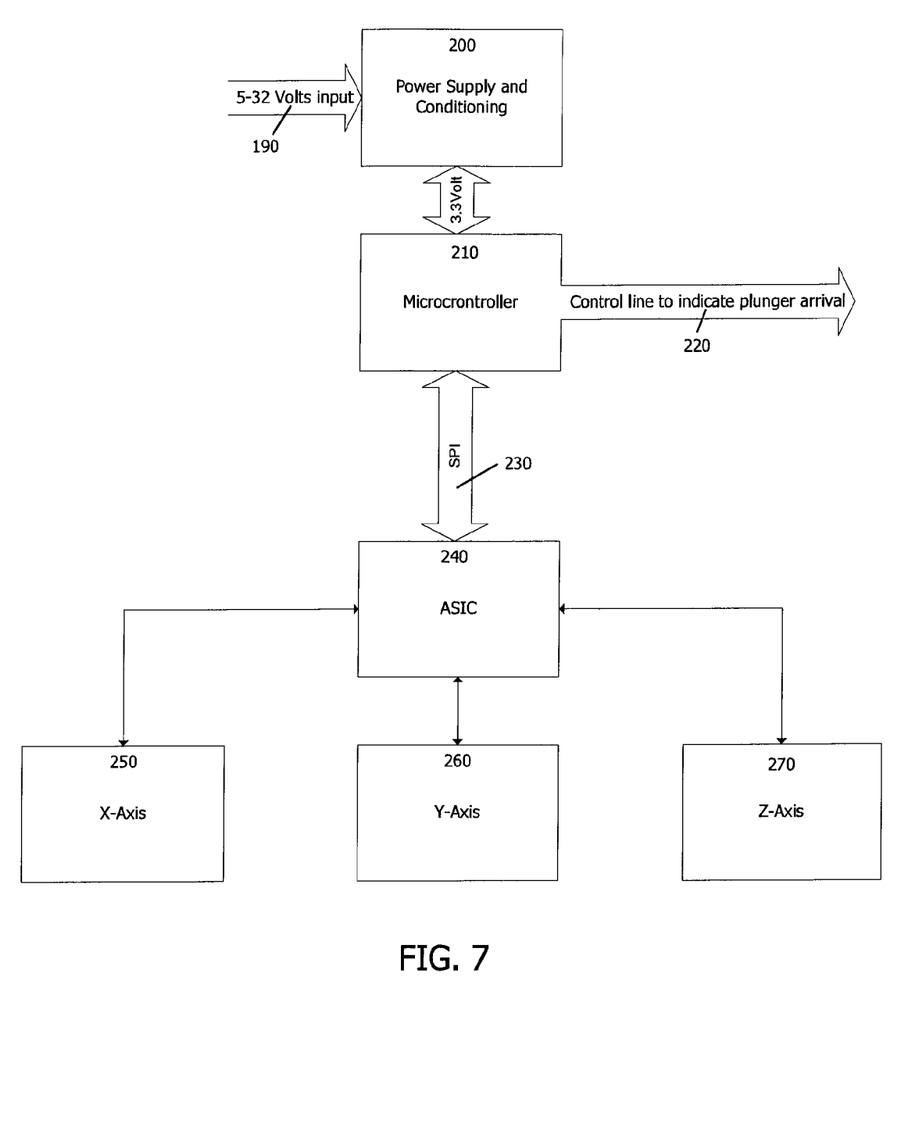
FIG. 7 is a functional block diagram of a microprocessor-based electronic circuit comprising plunger detection circuitry.

FIG. 7 is a functional block diagram of a microprocessor-based electronic circuit comprising plunger detection circuitry. Power supply and conditioning element 200 depicts system startup and system calibration. Directional arrow 190 represents a connection to one or more power sources which may comprise an internal battery, a rechargeable power source, a portable power cell, solar power, or external power supplied from an outside apparatus, etc.

Microprocessor (or microcontroller) 210 is adapted to manage and control the magnetometer sensor(s) and sensor reporting capabilities and to manage overall functions of the detection system. Directional arrow 220 represents an external signal to indicate plunger arrival. The microprocessor indicates a plunger arrival by driving low an external line that is typically pulled high to the external apparatus voltage supply. As a result, the disclosed device is capable of interfacing with a variety of equipment types making the system highly adaptable.

Microprocessor 210 interfaces with each of the axes through a custom application-specific integrated circuit (ASIC) 240. Communication to ASIC 220 is by a Serial Peripheral Interface (SPI) bus 230. Each axis (elements 250, 260, 270) is read individually by passing a command byte to the ASIC to initiate a sensor read. Once the read is complete, the resulting data is passed back to microprocessor 210 using SPI bus 230.

A memory module (not shown) may be provided and may contain the amount and type of memory required for performing intended functions such as storing code, caching sensor data, storing processing routines, etc. The memory module may be incorporated as a component of microprocessor 210. Alternately, it may be a separable, removable type of memory, several types of which are known in the art. An RF receiver/transmitter (not shown) may also be provided and connected to microprocessor 210 and may contain the required circuitry adapted to allow transmission and receipt of RF signals. In addition, an RF converter/adapter may be incorporated for converting RF analog data into digital data (and vice versa) for enabling transmissions.

Figure 8:
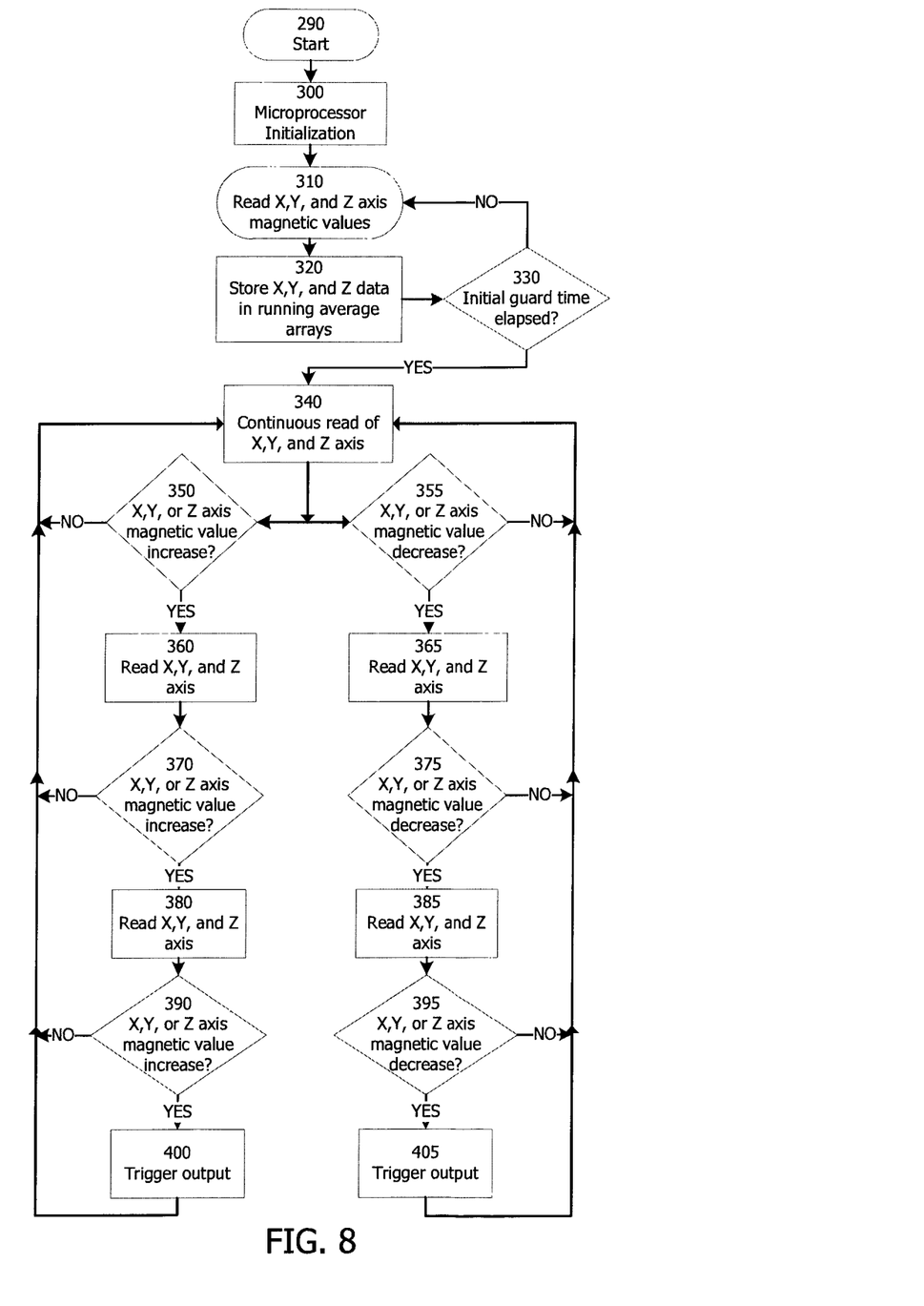
FIG. 8 is a process flow diagram illustrating the logical steps carried out by the disclosed system.

In the disclosed system, a calibration algorithm allows the detector to characterize a magnetic environment, the change of which is to be associated with an arriving plunger. FIG. 8 is a process flow diagram illustrating the logical steps carried out by the disclosed system. In step 290, the detection system is activated. Microprocessor 210 is initialized (step 300). Because the system is mounted adjacent to the lubricator, the system will read the magnetic values (step 310) of the lubricator piping and surrounding equipment and establish a baseline for the x, y, z axes. Microprocessor 210 will store the x, y, z data in running average arrays (step 320) and ascertain whether an initial guard time has elapsed (step 330). For example, if a pre-determined guard time is 5 seconds, the system will read and store x, y, z data for a period of 5 seconds, after which it will be begin to implement the next steps of the algorithm. The separate arrays are continuously updated with a running average method. Using a software algorithm with timed interrupts, data on all three axes is analyzed for a change representing a plunger arrival.

In step 340, microprocessor 210 causes the magnetometer to continuously read the ambient magnetic field. In one embodiment, the system reads data every 14 milliseconds (ms). This process continues until the plunger arrives or a local disturbance in the ambient magnetic field occurs. The disclosed system senses an increase (or decrease) caused by an approaching plunger and verifies the increase (or decrease) by comparing the occurrences with a change in the baseline to ascertain whether the plunger has arrived or if the system should continue to take readings. To illustrate, assume the pre-determined set point for each of the x, y, z-axes is a ±20 µT change in the magnetic field for three consecutive or consistent occurrences.

A plunger arrives, triggering a ±20 µT change at step 340. Depending on whether the system detects an increase or a decrease, the system will advance to step 350 or to step 355. The diagram depicts the logical steps related to increases in µT in the left branch of the diagram while the logical steps related to decreases in µT are shown in the right branch of the diagram.

Referring first to the left branch, the diagram shows that the system, having made a first determination that an increase occurred, will proceed to step 360 whereby microprocessor 210 will cause the magnetometer to read the x, y, z-axis values. If a determination is made that one of the axis values increases (step 370), the system will proceed to step 380 whereby microprocessor 210 will cause the magnetometer to again read the x, y, z-axis values. If a determination is made that one of the axis value increases (step 390), the system will proceed to step 400 whereby the system will recognize a plunger arrival and microprocessor 210 will execute a command to trigger the output for a designated interval, the output being an indicator that the plunger has arrived.

If, on the other hand, the system proceeds from step 340 to step 350 because of an increase yet determines at step 370 that none of the values have increased, the system will return to step 340 whereby the cycle is repeated and the x, y, z-axis values are read anew. If the system succeeds in advancing from step 340 to step 390 but then determines that none of the values have increased, the system will return to step 340 whereby the cycle is repeated and the x, y, z-axis values are read anew.

Referring now to the right branch, the diagram shows that the system, having made a first determination that a decrease occurred, will proceed to step 365 whereby microprocessor 210 will cause the magnetometer to read the x, y, z-axis values. If a determination is made that one of the axis values decreases (step 375), the system will proceed to step 385 whereby microprocessor 210 will cause the magnetometer to again read the x, y, z-axis values. If a determination is made that one of the axis value decreases (step 395), the system will proceed to step 405 whereby the system will recognize a plunger arrival and microprocessor 210 will execute a command to trigger the output for a designated interval, the output being an indicator that the plunger has arrived.

If, on the other hand, the system proceeds from step 340 to step 355 because of an decrease yet determines at step 375 that none of the values have decreased, the system will return to step 340 whereby the cycle is repeated and the x, y, z-axis values are read anew. If the system succeeds in advancing from step 340 to step 395 but then determines that none of the values have decreased, the system will return to step 340 whereby the cycle is repeated and the x, y, z-axis values are read anew.

In one embodiment, step 400 (or step 405) utilizes a one-second trigger interval. Although other interval lengths could be implemented, it was determined that the disclosed system with its capability of driving low an external line that is typically pulled high could operate using the designated interval, thus allowing for a quick system turnaround and increasing the potential for profitability. After the trigger is output, the system begins to continuously read x, y-, z-axis values so as to detect another trigger condition (step 340). These steps may be repeated as an endless loop or terminated as desired.

As depicted in FIG. 8, the sensor reads values in the x, y and z axes. Thus, the plunger may be detected by all the sensors (x, y, z). However, the firmware checks each axis individually and recognizes the detection of the plunger by any combination (y and z, for example) can cause the trigger output command. The firmware thus operates on a "first come, first served" basis meaning the first axis (x, y or z) to meet the detection parameters will cause the system to trip. The algorithm of the disclosed system establishes a baseline and looks for changes from the baseline data. In addition, the system also looks at step-wise increases (or decreases) from the previous x, y, and z readings. Thus, the values detected from any axis which meets the requirements (measurements greater than baseline and step-wise increase or decrease from previous reading plus delta) will trigger the output which signals the plunger has arrived.

The environment may or may not contain magnetic distortion influences. To address such influences, data gathered by the magnetometer(s) can be processed through a filter before being transferred as input data for the calibration methodology. In operation, if a value comes in too high (or too low), the next reading will more than likely be discarded and no trigger event will occur.

If storing large amounts of data is not desired, it is contemplated that a data dump routine could be implemented. For example, the disclosed device could store baseline data derived from the calibration methodology and a number of successive readings. Older data or non-baseline data could be deleted or overwritten. In other cases, it may be useful to store accumulated data. For example, it is contemplated that data collected over time could be used to indicate the condition of the plunger or the pattern of plunger wear which would facilitate the timely replacement of a plunger in a plunger lift system.

In one embodiment, a plunger detection apparatus processes data received from at least two and preferably three magnetometers, or from a magnetometer having at least two and preferably three axes. In another embodiment, a two or three-axis magnetic sensor comprises a processor, coupled to a user interface.

The disclosed device provides an apparatus and method which accurately detects plunger arrival by comparing the magnetic field of the plunger to the ambient magnetic field. The accuracy of the system is not influenced by factors which often affect other plunger arrival detection systems. Where other methodologies may fail to detect a plunger that is traveling too slow or too fast, the disclosed device is not influenced by the speed of the plunger. The instant device relies on detecting a change in the ambient magnetic field. As long as the detector reads a predetermined number of consistent readings as required by the trending algorithm, there is little concern whether trending occurs slower or faster. In addition, the disclosed device may detect a plunger that has stopped directly in front of the sensor.

Where other methodologies may fail to detect a plunger that has a low level of magnetism, i.e., stainless steel, the disclosed device is able to measure weak magnetic fields. Each axis measurement is made by a high-permeability magnetic core, the inductance of which will vary with the applied magnetic field. During measurement, each coil is set to oscillate by the use of a Schmitt trigger, both in forward bias and reverse bias. By measuring the time to complete a fixed number of oscillations (periods) that occur in the forward and reverse polarity directions and taking the difference between these two values, it is possible to derive the strength of the external magnetic field to great resolution. In short, the disclosed device is able to detect some of the lowest levels of magnetism that can exist in the plunger material.

Where other methodologies may fail to detect a plunger in which the orientation of the axis of the plunger's magnetic dipole is not optimal, the disclosed device can successfully detect plunger arrival. Similarly, factors such as rotation of the plunger, ambient temperature or pressure and changes, which can normally cause inconsistent readings of magnetic field values, no longer pose a problem. Because of the high level of accuracy provided, the disclosed device also has the ability to minimize or eliminate adjustments to be made by an operator including sensitivity adjustments.

Although the example herein identifies the arrival of a plunger upon the verification of three consecutive occurrences, one having skill in the art of trend analysis will recognize other settings/values can be employed.

The disclosed system provides highly accurate detection of plunger arrival(s). For example, using a 1¼" brush plunger, operators recorded the following data:

| Well Location | Plunger run performance without disclosed device | Plunger run performance with disclosed device | Number of days on well |
| --- | --- | --- | --- |
| Test well #1 (Thomason) | 18-26% | 100% | 120 |
| Test well #2 (Mick) | 10% | 100% | 90 |
| Test well #3 (Riva Red) | 34-36% | 100% | 90 |

Figure 9:
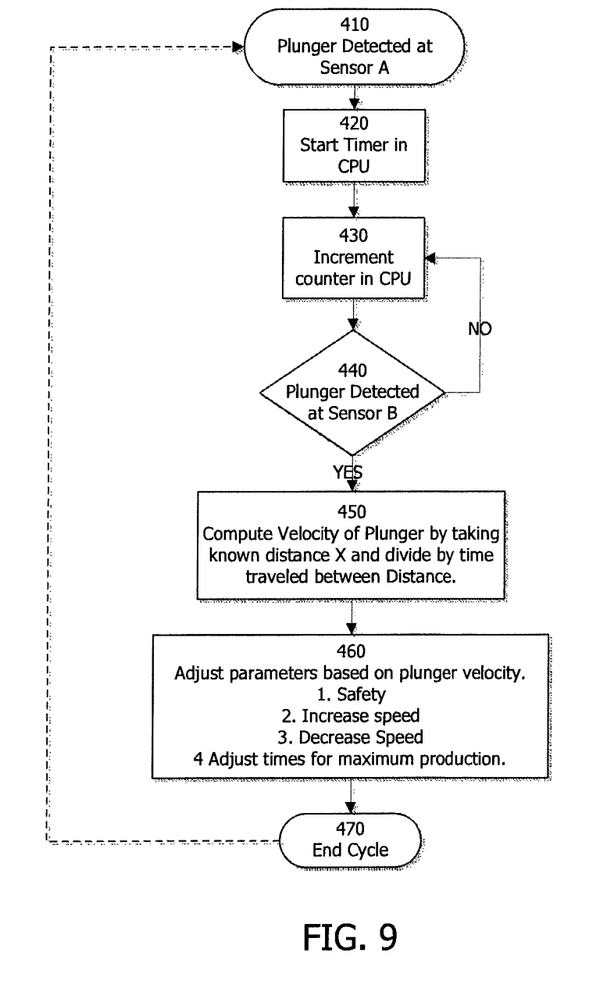
FIG. 9 is a process flow diagram illustrating the logical steps carried out by the disclosed system in determining the speed of a plunger within a well tubing.

FIG. 9 is a process flow diagram illustrating the logical steps for determining plunger speed when utilizing the disclosed device. While there are a number of sophisticated systems in the industry that are employed for determining plunger speed, these systems do not determine actual average plunger speeds. In many of these methodologies, a typical well controller will be used to establish the time for a plunger to arrive at the surface when a well first opens. It is well known that the average velocity v of an object moving through a distance (Δx) during a time interval (Δt) as described by the formula:

$$\bar{v} = \frac{\Delta x}{\Delta t}.$$

Knowing the approximate depth of the well, one can determine an approximate average velocity. However, as stated above, the value arrived at by this methodology is not an actual average plunger speed.

With the disclosed device, a first sensor 1001 may be mounted at a desired location in the downhole tubing 510 or casing 500. See FIG. 10. A second sensor 1002 may be mounted at a desired location in the downhole tubing 510 or casing 500 in spaced relation to sensor 1001. The distance between sensors 1001, 1002 is a known distance x. Sensors 1001, 1002 are electrically connected to an electronic well controller. In the example shown, CPU 520 serves as the controller however any remote controller can also be utilized. A CPU/controller should comprise a microprocessor or a timer to transmit telemetry data to the CPU/controller. In one embodiment, a MSP430F149 (Texas Instruments) was selected however other CPU/controllers can be used if suitable.

As the plunger travels up the well, sensor 1001 detects the arrival/passage of a plunger (step 410). See FIG. 9. This triggers the start-up of the timer in a CPU/controller (step 420). A timer/counter of a CPU/controller will establish a value of time $t_{1001}$ which corresponds with the arrival of the plunger detected by sensor 1001 (step 430). As the plunger continues to travel up the well, sensor 1002 detects the arrival/passage of the plunger (step 440). This triggers the timer/counter to establish a value of time $t_{1002}$ which corresponds with the arrival of the plunger detected by sensor 1002 (step 430). In step 450 the microprocessor computes the velocity of the plunger by dividing known distance x by the difference of $t_{1002}$ and $t_{1001}$. Thus the disclosed device provides for a simplified and highly accurate method of determining actual plunger velocity.

Using a plunger's actual velocity that is arrived at by the present method, adjustments to operational parameters can be made to optimize well control and improve safety of the overall system (step 460). For example, the velocity data can be used to identify a fast-arriving plunger. It is well known in the industry that a plunger that is coming up too fast can physically damage the surface of the well and the plunger itself. If the well head is breached, the fast-arriving plunger can cause physical damage to surface equipment and personnel close to the well head. One having skill in the art of process safety will recognize that a number of controls could be implemented for a well system with knowledge of the speed of a plunger. In a fast-arriving plunger scenario, one embodiment of the present system contemplates that system alarm(s) can be activated to shut in the well until the plunger's speed can be controlled to prevent catastrophic damage to well equipment and personnel and extend the life of the plunger.

In addition to improving safety and equipment damage issues, knowledge of a plunger's actual average velocity can enable improved well production performance. One embodiment of the present system contemplates the inclusion of one or more supplemental valves on a well head. These one or more valves can be opened or closed to change the speed of the plunger. For high pressure wells, a throttle valve can be placed in line or between the tubing and the casing. After a run during which an average velocity is established, a CPU/controller can make adjustments on a later run to increase or decrease speed to optimize the plunger's actual arrival speed.

The velocity information can also be utilized to improve well production performance without supplementing a system with additional equipment such as valves. It is known that a plunger's speed can be controlled (increased or decreased) as desired by controlling the shut in and open cycles. By having an accurate actual average speed, as provided by the disclosed system, the plunger's actual speed can be controlled as desired. For example, if a plunger is traveling too slowly, the shut in time may be increased so as to increase pressure build up in the tubing/casing. With the present device, shutting in the well to enable the plunger to increase its actual speed may present better results than with a system an approximate plunger speed. Optimally, a well's shut in time is reduced to a minimum to prevent excessive pressure build up and to minimize the duration of non-production of the well. By providing an accurate average velocity, the disclosed system enables a well to maximize its open time which thereby optimizes well operation. These steps may be terminated in step 470 or repeated as a loop (see step 410).

Figure 10:
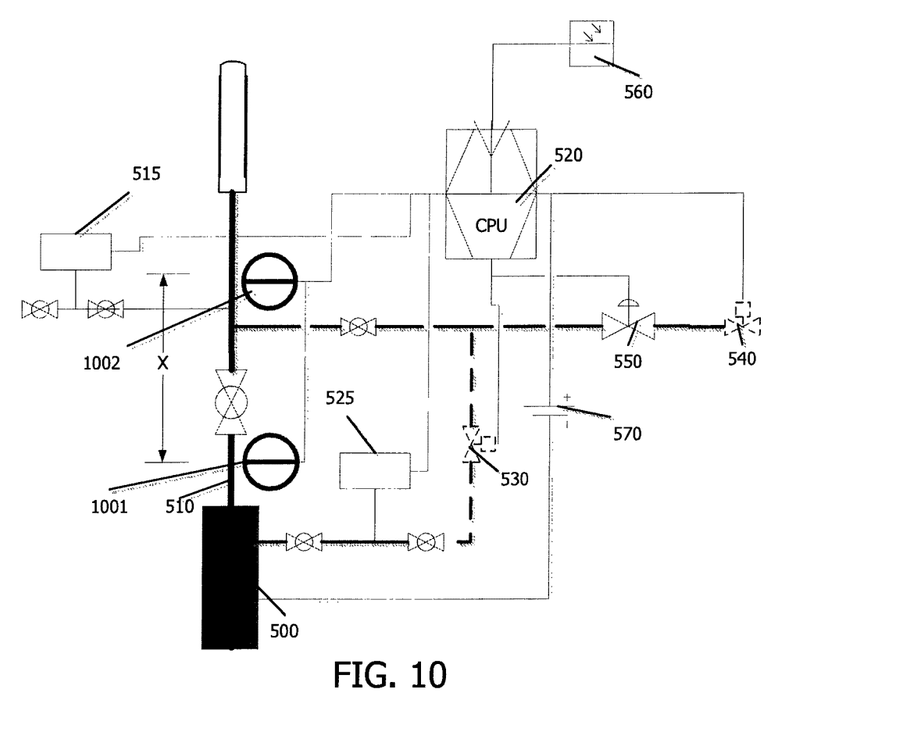
FIG. 10 is a well/circuit diagram wherein two sensing devices are utilized.

FIG. 10 depicts one embodiment of a well/circuit configuration which implements step 460. As shown, two sensors 1001, 1002 are mounted in line and in spaced relation to each other, separated by a distance x. In other words, x is the distance between sensors 1001, 1002. Pressure transducers 515, 525 are mounted to tubing 500 and casing 510 to measure tubing and casing pressure, respectively. CPU 520 comprising microprocessor and an antenna (typically 900 MHz and 2.4 GHz) transmits pressure data to a CPU/controller. As stated above, CPU 520 can serve as the controller; however any remote controller can also be utilized. Solar panel 560 and battery 570 can provide power for CPU 520 by means of a solar charging circuit.

The CPU/controller can slow the speed of the plunger by opening/closing one or more valves. The disclosed system contemplates the placing of optional throttle valve 530 between the tubing and the casing. In the case of a fast-arriving plunger, optional throttle valve 530, which is controllable by CPU 520 or other controller, can be used to increase or decrease the speed of a traveling plunger by modifying the casing pressure. The disclosed system also contemplates the placing of an optional throttle valve 540 directly in line with the tubing. Optional throttle valve 540, also controllable by CPU 520 or other controller, can be used to increase or decrease the speed of a traveling plunger by modifying the tubing pressure. Valve 550 can be used to adjust production times so as to optimize well production. By knowing the plunger's actual average velocity, shut in time and open time can be modified for improved production. However, if the throttle valve opens the flow on the casing, flow on the tubing increases. Similarly, if the throttle valve opens the flow on the tubing, flow on the casing increases. Thus, placing a throttle valve between the tubing and the casing may not be as effective at controlling plunger speed as placing a throttle valve directly in line with the tubing.

As shown in FIG. 10, two sensors 1001, 1002 are mounted in line and in spaced relation to each other. It is contemplated that additional sensors could be employed if suitable, the additional sensors mounted in spaced relation one to another.

The disclosed device provides a high-accuracy plunger arrival detection system comprising a low-power magnetometer with high sensitivity and which is capable of sampling low or high intensity magnetic fields. The device processes gathered data from sensors, stores at least some processed data in memory, executes a trending algorithm which compares the magnetic field of the plunger to the ambient magnetic field or a predetermined set of initialization values, and generates an output which is relayed to a well controller. An output signal may be via hard wire, RF, wireless or other known means. In addition, the implementation of two sensing devices mounted in series and in spaced relation to each other, can provide for an actual plunger average velocity. An actual plunger average velocity, as opposed to approximate average velocity, can be used to better optimize well control and improve safety of the overall well production system.

Although the disclosed device and method have been described with reference to disclosed embodiments, numerous modifications and variations can be made and still the result will come within the scope of the disclosure. No limitation with respect to the specific embodiments disclosed herein is intended or should be inferred.

We claim:

1. An apparatus utilizing a magnetic inductive sensor for detecting a plunger arrival at a wellhead, said apparatus comprising:
   a power supply;
   a magnetometer system having at least a first axis magnetic field sensor and a second axis magnetic field sensor, wherein axes of said magnetic field sensors are transverse;
   a microprocessor system adapted to manage and control the magnetometer system, the microprocessor system further comprising electronic memory;
   the magnetometer system coupled to the microprocessor for measuring a magnetic field value of a first axis of using said first axis magnetic field sensor and a magnetic field value of a second axis using said second axis magnetic field sensor;
   the microprocessor gathering magnetic field data from said magnetometer system and configured to:
     identify, from a measurement of said magnetometer system, a first magnetic field change greater than a predetermined delta of one of said first axis and said second axis relative to a corresponding one of first and second baseline magnetic field values for said first axis and said second axis;
     identify a second change in a magnetic field value of one of said first axis and said second axis to a previous magnetic field value of a previous magnetic field value of said axis; and
     upon identifying said first change and said second change, generate an output to an electronic wellhead controller to indicate a plunger arrival; and wherein one or both of the magnetometer system and the microprocessor are mountably located at an exterior position of a lubricator.

2. The apparatus of claim 1, wherein said microprocessor is further configured to:
   generate said first and second baseline magnetic field values for said first axis and said second axis.

3. The apparatus of claim 2, wherein said microprocessor generates said first and second baseline magnetic field values based on a running average of a predetermined number of previous magnetic field measurements for said first axis and said second axis.

4. The apparatus of claim 1, wherein said processor is configured to identify said first change in said magnetic field of one of said first axis and said second and identify said second change in a magnetic field of the other of said first axis and said second axis in said immediately subsequent measurement.

5. The apparatus of claim 1, wherein said magnetometer system further includes a third axis magnetic field sensor, wherein an axis of said third axis magnetic field sensor is transvers to axes of said first magnetic field sensor and said second magnetic field sensor.

6. A method for utilizing a multi-axis magnetic inductive sensor for detecting a plunger arrival at a wellhead, comprising:
   operating a magnetometer system to measure magnetic field values of first and second transverse axes, wherein said magnetometer system is mounted to a wellhead;
   operating a processor to generate at least a first axis baseline value and a second axis baseline value using said magnetic field values from said magnetometer system;
   operating said magnetometer systems to measure subsequent magnetic field values of said first and second transverse axes after generating said baseline values;
   operating said processor to:
     compare said subsequent magnetic field values to said baseline values;
     identifying a first change in a magnetic field value for one of said first and second transverse axes, said first change being greater than a predetermined value, relative to a corresponding one of said first axis baseline value and said second axis baseline value;
     identifying, a second change in a magnetic field value of one of said first axis and said second axis relative to a previous magnetic field value for said axis; and
     upon identifying said first change and said second change, generating an output to an electronic wellhead controller to indicate a plunger arrival.

7. The method of claim 6, wherein said microprocessor operates to generate generates said first axis baseline value and said second axis baseline value based on a running average of a predetermined number of previous magnetic field measurements for said first and second transverse axes.

8. The method of claim 6, wherein said processor operate to identify said first change of one of said first and second transverse axes and identify said second change in the other of said first and second transverse axes.

9. The method of claim 1, wherein said manometer system operates to measure magnetic field values along a third axis transverse to said first and second transverse axes.

* * * * *

UNITED STATES PATENT AND TRADEMARK OFFICE
CERTIFICATE OF CORRECTION

PATENT NO. : 9,181,768 B2  
APPLICATION NO. : 13/161431  
DATED : November 10, 2015  
INVENTOR(S) : Terry R. Wright et al.

Page 1 of 1

It is certified that error appears in the above-identified patent and that said Letters Patent is hereby corrected as shown below:

IN THE CLAIMS

At Column 12, line 50, after generate, delete "generates"

At Column 12, line 54, delete "operate" and insert therefor --operates--

At Column 12, line 58, delete "manometer" and insert therefor --magnetometer--

Signed and Sealed this
Twenty-ninth Day of March, 2016

Michelle K. Lee
*Director of the United States Patent and Trademark Office*